Patented Apr. 13, 1948

2,439,648

UNITED STATES PATENT OFFICE 2,439,648

CYCLONITE PURIFICATION

Jerome G. Burtle and Wilfred H. Brandt, Alton, Ill., assignors to Olin Industries, Inc., a corporation of Delaware No Drawing. Application September 25, 1944, Serial No. 555,764

14 Claims. (Cl. 260—248)

This invention relates to explosives and their production and more particularly to their refinement.

This invention has utility when employed in the manufacture of purified cyclotrimethylenetrinitramine, which is commonly known as cyclonite and will be referred to herein as such as well as in the appended claims.

The primary object of the present invention is to produce purified cyclonite from crude or unstable cyclonite by an inexpensive process requiring only the use of comparatively low cost materials.

Another object is to produce a cyclonite with a lower acid content than the normal or crude cyclonite formed by the usual reactions.

Still another object is to produce a material with a higher melting point, and good stability.

Other objects and advantages will be apparent in the following specification and claims.

Crude cyclonite can be prepared in several ways, for example by the nitration of hexamethylenetetramine ($C_6H_{12}N_4$) which is an intermediate formed by the evaporation of an aqueous solution of formaldehyde and ammonia. The production of crude cyclonite and its properties are described in "Chemistry of Power and Explosives" by Davis, vol. II, page 396 (published 1943 by John Wiley & Sons).

It has been discovered that the physical properties of cyclonite are vastly improved by the invention herein disclosed which comprises subjecting a crude or unstable cyclonite to a treatment in an acqueous solution of a nitroparaffin and a water soluble ketone.

Any suitable nitroparaffin may be employed, for instance nitromethane, nitroethane, nitropropane, or nitrobutane, and likewise any suitable water soluble ketone, for instance acetone or ethyl methyl ketone. An amount of water may be employed within a wide range of percentages, but for most efficient purification and operation an amount in the range of about 30% up to about 75% is preferred. The ratio of ketone to nitroparaffin may be varied appreciably, but about 0.5 to 2 parts of ketone to one part of nitroparaffin are preferred. The time of treatment may be varied from about 30 minutes to about 10 hours, or more with good results, depending on the nature of the crude material being processed. The treating temperature of the bath is above atmospheric but less than boiling and is preferably in the range of about 50° to 80° C. During the treatment, the cyclonite is maintained suspended in the bath by means of vigorous agitation.

By way of example, following are typical embodiments illustrating the invention, in which is described the treatment of crude or unstable cyclonite, taken directly from the nitration reaction without previous purification treatment except for water washing.

The crude cyclonite having a melting point in the range of about 195° to 201° C. is suspended by means of vigorous agitation in a mixture of about 52% water, 26% 2-nitropropane, and 22% acetone for about 2 hours at a temperature in the range of about 55° C. to 60° C. The amount of treating solution employed is in the ratio of about 4 cubic centimeters to about 1 gram of cyclonite.

After the two hour period the cyclonite is separated from the treating bath by filtering, and is water washed to remove the constituents of the bath. If desired, the acetone and nitroparaffin may be recovered from the treating bath by steam distillation. The cyclonite is then dried, for instance by ether drying methods.

The purified product so treated has shown results including a melting point as high as about 204.0° C., low acidity, and a good stability as represented by as low as only 2 cubic centimeters of gas being evolved by 5 grams of cyclonite held at 150° C., in vacuo, for twenty-four hours.

In another embodiment, the crude cyclonite is treated as described above, except that a treating solution is employed containing about 50% water and 50% nitroparaffin plus ketone, with about 1.8 parts ketone to one part of nitroparaffin. In one instance with this method, the melting point of the crude cyclonite was in the range of from 195.8° C. to 201.8° C. and after the poaching treatment the melting point was raised to about 203.4° C.

During such a treatment with ketone and nitroparaffin, the acidity of the cyclonite tends to decrease as the material is purified. For example, after about two hours poaching the acidity of the cyclonite reaches a minimum and decreases only slightly even after about 10 hours poaching.

The purifying action of the treating bath, in accordance with this invention, is greatly facilitated by the slight solubility of the cyclonite in the bath. Such solubility is not sufficient however, to prevent the attainment of high product yields, and, in fact, much higher yields than are obtained with ordinary recrystallization processes.

In another embodiment, for particularly refractory crudes, a preliminary poach in an alkaline solution, for instance 1% sodium carbonate or perborate, followed by the ketone and nitro-paraffin treatment has been found very effective in producing a cyclonite of good stability and low acidity.

By employing the methods set forth in the above specific examples it is possible to so purify the crude cyclonite as to produce a product with greatly improved physical properties and having the advantages characteristic of this invention.

It should be understood the above embodiments are to be considered as only illustrative and that the invention is not limited thereto except as set forth in the appended claims.

What is claimed and desired to secure by United States Letters Patent is:

1. The method of treating cyclonite comprising poaching the same in an aqueous bath containing acetone and a nitroparaffin.

2. The method of treating cyclonite by subjecting the same to an aqueous poaching bath containing acetone and 2-nitropropane.

3. The method of treating cyclonite by subjecting the same to an aqueous poaching bath containing a ketone and 2-nitropropane.

4. The method of treating cyclonite by poaching the same in an aqueous solution of acetone and a nitroparaffin.

5. The method of treating cyclonite by poaching the same in a bath of approximately 50% water and approximately equal amounts of acetone and 2-nitropropane.

6. The method of treating cyclonite by subjecting the same to an aqueous poaching bath containing acetone and 2-nitropropane for at least about one half hour.

7. The method of treating cyclonite by subjecting the same to an aqueous poaching bath containing acetone and 2-nitropropane at a temperature in the neighborhood of 50° to 80° C.

8. The method of claim 7 wherein the time of poaching is in the range of about one half to ten hours.

9. The method of purifying cyclonite comprising suspending the impure cyclonite in an aqueous solution of a ketone and a nitroparaffin at elevated temperature.

10. The method of stabilizing cyclonite which comprises suspending the unstable cyclonite in an aqueous solution of acetone and 2-nitropropane at a temperature in the range of about 50° C. to 80° C.

11. The method of stabilizing cyclonite which comprises suspending said cyclonite in an aqueous solution of a water soluble ketone and a nitroparaffin, said bath having a water content of about 30% to 75% with about 0.5 to 2 parts ketone to 1 part nitroparaffin, at elevated temperature.

12. The method as set forth in claim 9 in which the cyclonite is first treated with an aqueous solution of an alkaline salt at elevated temperature.

13. The method as set forth in claim 9 in which the cyclonite is first treated in an aqueous solution of sodium carbonate at elevated temperature.

14. The method of stabilizing cyclonite by heating in a bath comprising an aqueous solution of a nitroparaffin and a water soluble ketone.

JEROME G. BURTLE.
WILFRED H. BRANDT.

REFERENCES CITED

The following references are of record in the file of this patent:

UNITED STATES PATENTS

| Number | Name | Date |
|---|---|---|
| 1,402,693 | Herz | Jan. 3, 1922 |
| 2,410,699 | Wyler | Nov. 5, 1946 |

FOREIGN PATENTS

| Number | Country | Date |
|---|---|---|
| 670,921 | Germany | Jan., 1939 |

OTHER REFERENCES

Chem. Reviews, vol. 32, page 389.
Hale, Journal Amer. Chem. Soc., vol. 47, 1927, pages 2754–2763.